United States Patent
Higashi

(10) Patent No.: US 12,547,142 B2
(45) Date of Patent: Feb. 10, 2026

(54) CONTROL SYSTEM, CONTROL METHOD, AND PROGRAMMABLE LOGIC CONTROLLER

(71) Applicant: Mitsubishi Electric Corporation, Tokyo (JP)

(72) Inventor: Hidekazu Higashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 348 days.

(21) Appl. No.: 18/037,328

(22) PCT Filed: Jun. 3, 2021

(86) PCT No.: PCT/JP2021/021124
§ 371 (c)(1),
(2) Date: May 17, 2023

(87) PCT Pub. No.: WO2022/254643
PCT Pub. Date: Dec. 8, 2022

(65) Prior Publication Data
US 2023/0408998 A1     Dec. 21, 2023

(51) Int. Cl.
*G05B 19/05*     (2006.01)
*G05B 19/042*    (2006.01)

(52) U.S. Cl.
CPC ......... *G05B 19/05* (2013.01); *G05B 19/0421* (2013.01)

(58) Field of Classification Search
None
See application file for complete search history.

(56) References Cited

U.S. PATENT DOCUMENTS

| | | |
|---|---|---|
| 2020/0244594 A1 | 7/2020 | Yoneda |
| 2022/0365515 A1 | 11/2022 | Hashishita et al. |

FOREIGN PATENT DOCUMENTS

| | | |
|---|---|---|
| JP | 2019-12953 A | 1/2019 |
| JP | 2019-62467 A | 4/2019 |
| JP | 6749529 B1 | 9/2020 |
| WO | 2019/065015 A1 | 4/2019 |

OTHER PUBLICATIONS

International Search Report and Written Opinion mailed on Aug. 3, 2021, received for PCT Application PCT/JP2021/021124, filed on Jun. 3, 2021, 14 pages including English Translation.
Kei Murakami, "1.What us Real-Time Hypervisor", "2.Development case of PC controller with high precision", fig. 7, (Concurrent Invocation of Windows andRTOS on x86 Machine), Interface vol. 37, No. 11, Nov. 2011, pp. 107-117.

*Primary Examiner* — Sean Shechtman
(74) *Attorney, Agent, or Firm* — XSENSUS LLP

(57) ABSTRACT

A programmable logic controller (PLC) system includes a PLC module connectable to an external device (19) and a data collection-analysis module (13). The data collection-analysis module (13) is connected to the PLC module through signal lines (16). The data collection-analysis module (13) includes a real-time processor (21) that is operable by a real-time operating system and performs, when target data collected from the PLC module through the signal lines (16) has a size less than or equal to a size threshold, a computation on the target data to generate control data for controlling the external device (19), and a general-purpose processor (31) connected to the real-time processor (21) to perform, when the real-time processor (21) does not perform a computation on the collected target data, a computation on acquired target data to generate the control data.

8 Claims, 15 Drawing Sheets

FIG.3

EXAMPLE STORED DATA PIECES

| SETTING NUMBER | COLLECTION TARGET PLC MODULE | DEVICE NAME | SCORE | HEAD NUMBER | END NUMBER | COLLECTION FREQUENCY |
|---|---|---|---|---|---|---|
| 1 | CPU MODULE NO. 1 | INTERNAL RELAY | 5 | 10 | 14 | 10ms |
| 2 | CPU MODULE NO. 1 | DATA REGISTER | 150 | 2048 | 2197 | 300ms |
| 3 | CPU MODULE NO. 2 | BUFFER MEMORY | 1000 | 0 | 999 | 1000ms |
| 4 | PLC MODULE NO. 1 | INPUT DEVICE | 1 | 150 | 150 | 5ms |
| 5 | PLC MODULE NO. 2 | OUTPUT DEVICE | 3 | 20 | 22 | 5ms |
| 6 | ... | ... | ... | ... | ... | ... |
| 7 | ... | ... | ... | ... | ... | ... |
| 8 | ... | ... | ... | ... | ... | ... |
| 9 | PLC MODULE NO. N | INPUT DEVICE | 2 | 80 | 81 | 2ms |

FIG. 5

EXAMPLE STORED DATA PIECES

| SETTING NUMBER | COLLECTION TARGET PLC MODULE | DEVICE NAME | SCORE | HEAD NUMBER | END NUMBER | COLLECTION FREQUENCY | DATA ANALYSIS OS |
|---|---|---|---|---|---|---|---|
| 1 | CPU MODULE NO. 1 | INTERNAL RELAY | 5 | 10 | 14 | 10ms | REAL-TIME OS |
| 2 | CPU MODULE NO. 1 | DATA REGISTER | 150 | 2048 | 2197 | 300ms | GENERAL-PURPOSE OS |
| 3 | CPU MODULE NO. 2 | BUFFER MEMORY | 1000 | 0 | 999 | 1000ms | GENERAL-PURPOSE OS |
| 4 | PLC MODULE NO. 1 | INPUT DEVICE | 1 | 150 | 150 | 5ms | REAL-TIME OS |
| 5 | PLC MODULE NO. 2 | OUTPUT DEVICE | 3 | 20 | 22 | 5ms | REAL-TIME OS |
| 6 | ... | ... | ... | ... | ... | ... | ... |
| 7 | ... | ... | ... | ... | ... | ... | ... |
| 8 | ... | ... | ... | ... | ... | ... | ... |
| 9 | PLC MODULE NO. N | INPUT DEVICE | 2 | 80 | 81 | 2ms | GENERAL-PURPOSE OS |

FIG.8

EXAMPLE STORED DATA PIECES

| INSTRUCTION NUMBER | INSTRUCTION TARGET PLC MODULE | DEVICE NAME | IDENTIFICATION NUMBER | VALUE |
|---|---|---|---|---|
| 1 | CPU MODULE NO. 1 | DATA REGISTER | 4096 | 8 |
| 2 | PLC MODULE NO. 1 | INPUT DEVICE | 24 | 31 |
| ... | ... | ... | ... | ... |
| 6 | CPU MODULE NO. 2 | BUFFER MEMORY | 2000 | 128 |

CONTROL SYSTEM, CONTROL METHOD, AND PROGRAMMABLE LOGIC CONTROLLER

CROSS-REFERENCE TO RELATED APPLICATION

The present application is based on PCT filing PCT/JP2021/021124, filed Jun. 3, 2021, the entire contents of which are incorporated herein by reference.

TECHNICAL FIELD

The present disclosure relates to a programmable logic controller and a method for operating the programmable logic controller.

BACKGROUND ART

Devices for automating manufacturing processes are used at factories. Such devices are controlled by programmable logic controllers (PLCs). A PLC collects data from a target device through a network, analyzes the collected data, and provides the analysis results as feedback to the target device to control the target device.

The analysis includes complex calculations and thus is often performed using application software operating on a general-purpose operating system (OS). The PLC with no general-purpose OS transfers the data to another analyzer through a network. The analyzer receiving the data performs analysis.

Patent Literature 1 describes a system including a PLC that collects data and causes a network-connected control apparatus to perform analysis.

CITATION LIST

Patent Literature

Patent Literature 1: Unexamined Japanese Patent Application Publication No. 2019-062467

SUMMARY OF INVENTION

Technical Problem

The controller included in the system described in Patent Literature 1 performs communication using a communication bandwidth divided into a section for control data about control and a section for information data other than the control data. This technique can transmit a predetermined amount of control data independently of the amount of information data transmitted and thus can control devices with the control process being less susceptible to transmission of the information data.

However, the system described in Patent Literature 1 transfers all the analysis target data from the controller to an analyzer. The system thus takes time for data transfer and cannot perform short-time, high-frequency data analysis and feedback.

In response to the above issue, an objective of the present disclosure is to provide a programmable logic controller that can perform efficient analysis and a method for operating the programmable logic controller.

Solution to Problem

To achieve the above objective, a programmable logic controller according to an aspect of the present disclosure includes a first module connectable to an external device and a second module. The second module is connected to the first module through a network. The second module includes a first processor that is operable by a real-time operating system and performs, when target data collected from the first module through the network has a size less than or equal to a size threshold, a computation on the target data to generate control data for controlling the external device, and a second processor connected to the first processor and configured to acquire, when the first processor does not perform a computation on the collected target data, from the first processor, the target data collected by the first processor and perform a computation on the acquired target data to generate the control data. The first module acquires the control data generated by the first processor or the second processor to control the external device.

Advantageous Effects of Invention

The programmable logic controller and a method for operating the programmable logic controller according to the aspects of the present disclosure allow, for efficient analysis, the first processor operable by the real-time operating system to collect data and analyze a small volume of data including information added for transfer and having a larger size ratio of the additional information to the original data, without transferring such data.

BRIEF DESCRIPTION OF DRAWINGS

FIG. 3 is a table of specific example data pieces set with the PLC system illustrated in FIG. 1;

FIG. 5 is a table of different specific example data pieces set with the PLC system illustrated in FIG. 1;

FIG. 8 is a table of different specific example data pieces set with the PLC system illustrated in FIG. 1;

DESCRIPTION OF EMBODIMENTS

Embodiment 1

A PLC system 10 according to Embodiment 1 of the present disclosure is now described with reference to the drawings.

Overview of PLC System 10

Figure 1:
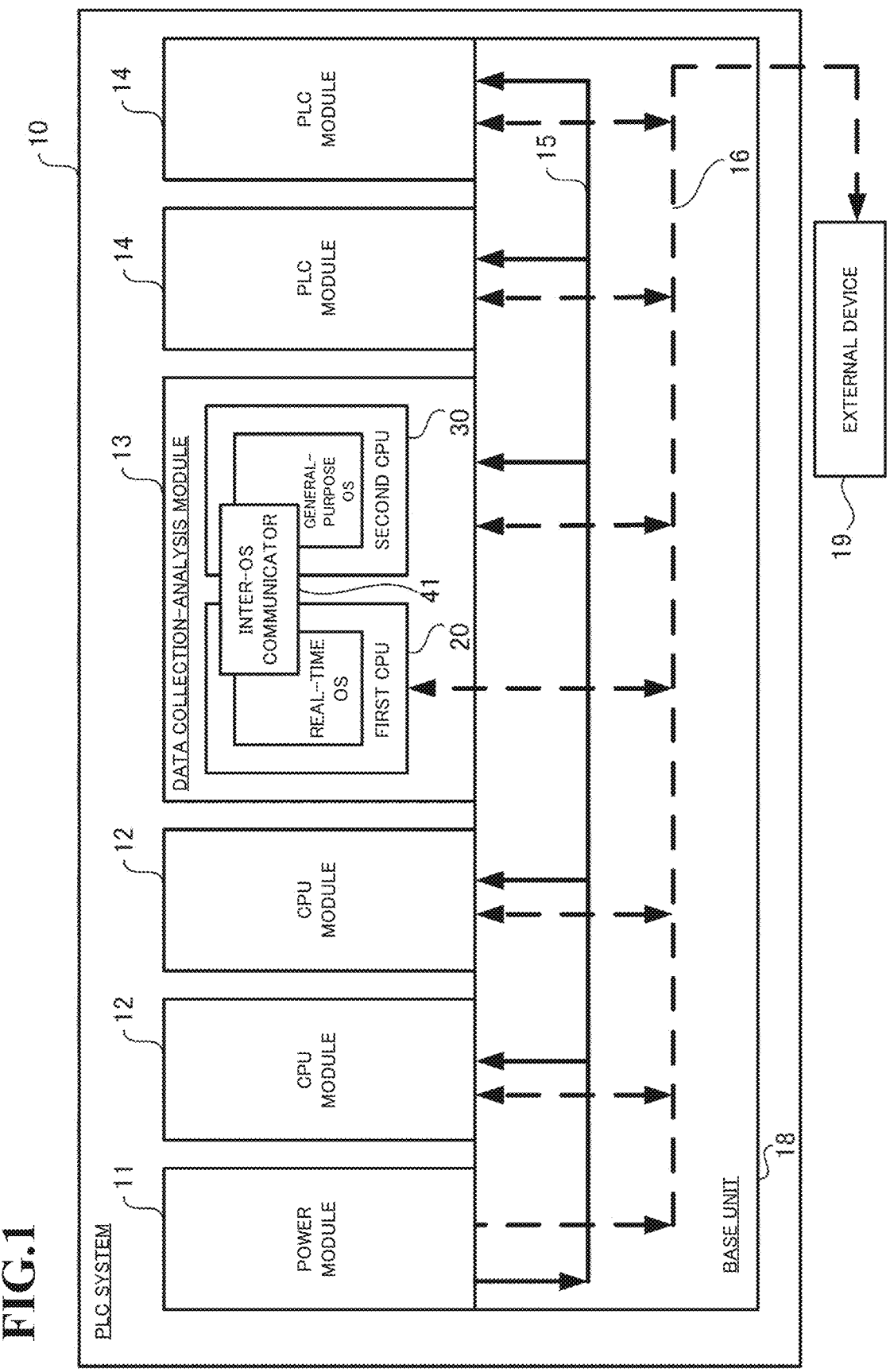
FIG. 1 is a block diagram of a PLC system according to Embodiment 1 of the present disclosure.

The PLC system 10 illustrated in FIG. 1 acquires data from an external device 19 and analyzes the acquired data to control the external device 19.

The PLC system 10 includes functional units having individual functions, or in other words, modules.

More specifically, the PLC system 10 includes a power module 11 that powers modules included in the PLC system 10, a central processing unit (CPU) module 12 that centrally controls the PLC system 10, a data collection-analysis module 13 that collects data from, for example, the CPU module 12 and a PLC module 14 (described below) and analyzes the collected data, and the PLC module 14 that acquires signals from, for example, switches and sensors attached.

The power module 11, the CPU module 12, the data collection-analysis module 13, and the PLC module 14 are connected to a base unit 18 including a system bus including, for example, power lines 15 and signal lines 16.

The power module 11 is electrically connected to the power lines 15 in the base unit 18. The power module 11 powers, for example, the CPU module 12, the data collection-analysis module 13, and the PLC module 14 through the power lines 15.

The CPU module 12 transmits and receives data to and from the data collection-analysis module 13 and the PLC module 14 through the signal lines 16 to centrally control the PLC system 10.

The data collection-analysis module 13 collects data from modules such as the CPU module 12 and the PLC module 14, and analyzes the collected data using a first CPU 20 and a second CPU 30 (described later). Data as a collection and analysis target is hereafter referred to as target data.

The data collection-analysis module 13 operates a real-time operating system (real-time OS) to perform scheduling that satisfies temporal constraints and a general-purpose OS.

The real-time OS is executed by the first CPU 20. The general-purpose OS is executed by the second CPU 30.

The first CPU 20 communicates with the CPU module 12 and the PLC module 14 through the signal lines 16.

The PLC module 14 is, for example, an input-output module for inputting and outputting data. The data collection-analysis module 13 transmits, to the PLC module 14, control data for controlling the external device 19. The PLC module 14 receives the control data transmitted from the data collection-analysis module 13 and controls the external device 19.

The PLC module 14 is an example of a first module. The data collection-analysis module 13 is an example of a second module.

In the example described below, the data collection-analysis module 13 characteristic of the present embodiment is mainly described.

Figure 2:
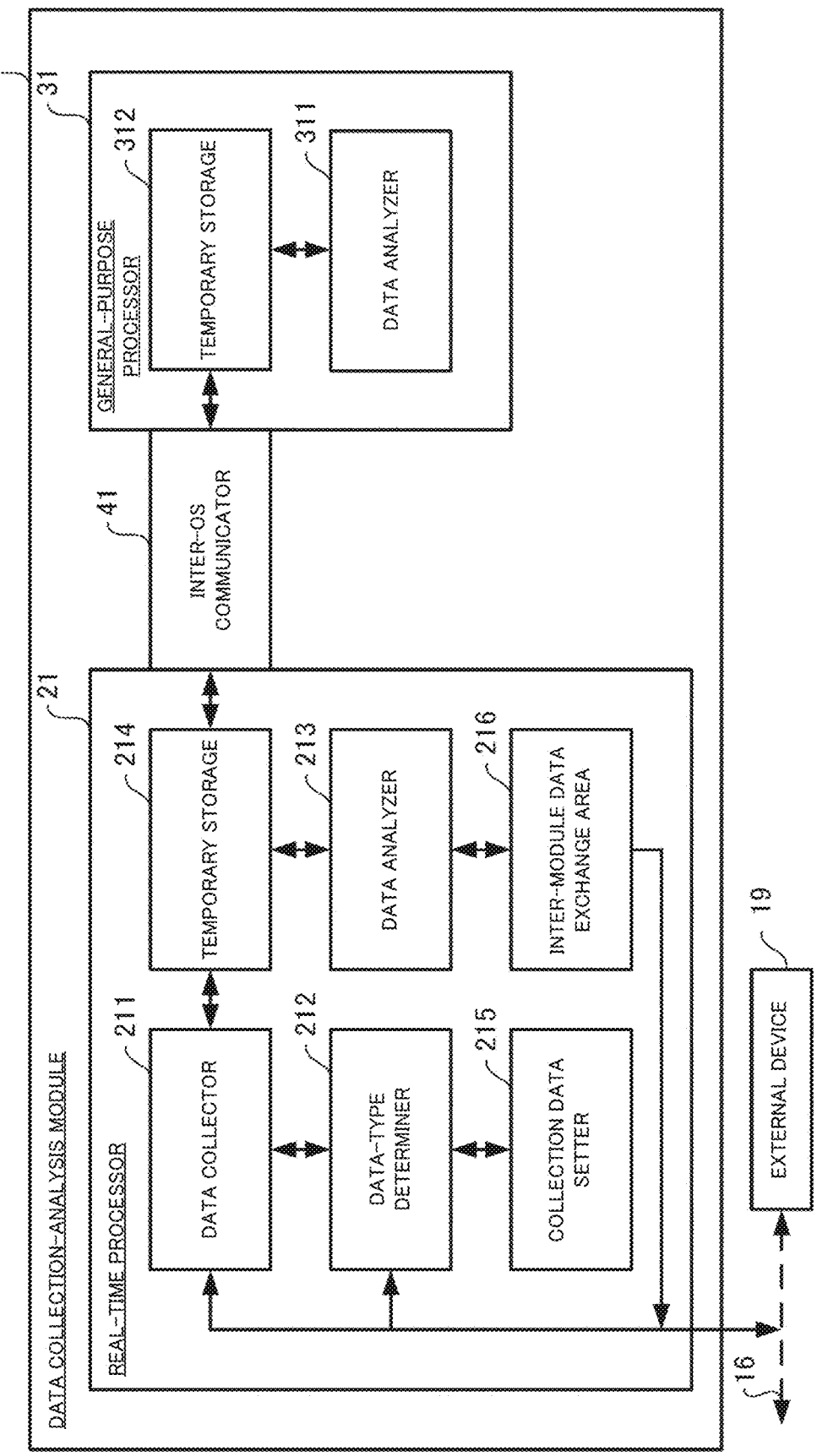
FIG. 2 is a block diagram of a module included in the PLC system illustrated in FIG. 1.

The data collection-analysis module 13 illustrated in FIG. 2 includes a real-time processor 21 that primarily analyzes target data collected from the PLC module 14 illustrated in FIG. 1, a general-purpose processor 31 that acquires target data not analyzed by the real-time processor 21 from the real-time processor 21 and secondarily analyzes the data, and an inter-OS communicator 41 that serves as a communication interface between the real-time processor 21 and the general-purpose processor 31.

The real-time processor 21 has the computing capability implemented by the first CPU 20 illustrated in FIG. 1. The general-purpose processor 31 has the computing capability implemented by the second CPU 30 illustrated in FIG. 1.

The real-time processor 21 includes a data collector 211 that collects target data from the PLC module 14, a data-type determiner 212 that determines one of the real-time processor 21 and the general-purpose processor 31 to analyze the target data, a data analyzer 213 that analyzes the target data, a temporary storage 214 that temporarily stores the collected target data, a collection data setter 215, and an inter-module data exchange area 216 that exchanges the analyzed data with other modules.

The data collector 211 collects, through the signal lines 16, target data from other modules and stores the collected data into the temporary storage 214.

The temporary storage 214 is a volatile area in a storage area controlled by the real-time processor 21 and is accessible by both the real-time processor 21 and the general-purpose processor 31.

The general-purpose processor 31 includes a data analyzer 311 that analyzes target data acquired through the inter-OS communicator 41 and a temporary storage 312 that temporarily stores the target data acquired through the inter-OS communicator 41.

The real-time processor 21 is an example of a first processor. The general-purpose processor 31 is an example of a second processor.

The inter-OS communicator 41 is a communication interface, for example, PCI-Express (a registered trademark) with a speed higher than the speeds specified by typical local area network (LAN) standards. The real-time processor 21 and the general-purpose processor 31 are connected to each other not through the signal lines 16 and can directly exchange data between them.

The data collector 211 collects target data based on information that is set with the collection data setter 215 and stores the target data into the temporary storage 214.

More specifically, as illustrated in FIG. 3, the collection data setter 215 sets, for each setting number being a unique identification number, the PLC module 14 as a collection target, the device name indicating the name of an external device connected to the CPU module 12 or to the PLC module 14, the score as the size of target data to be collected, the head number indicating the starting position in the target data to be collected at which the collection starts, the end number indicating the ending position in the target data to be collected at which the collection ends, and the collection frequency of the data.

For example, setting number 1 indicates that the data collector 211 collects, from an internal relay as the external device included in a CPU module 12 no. 1, target data with a size 5 from a head number 10 to an end number 14 at intervals of 10 milliseconds as the collection frequency.

Figure 4:
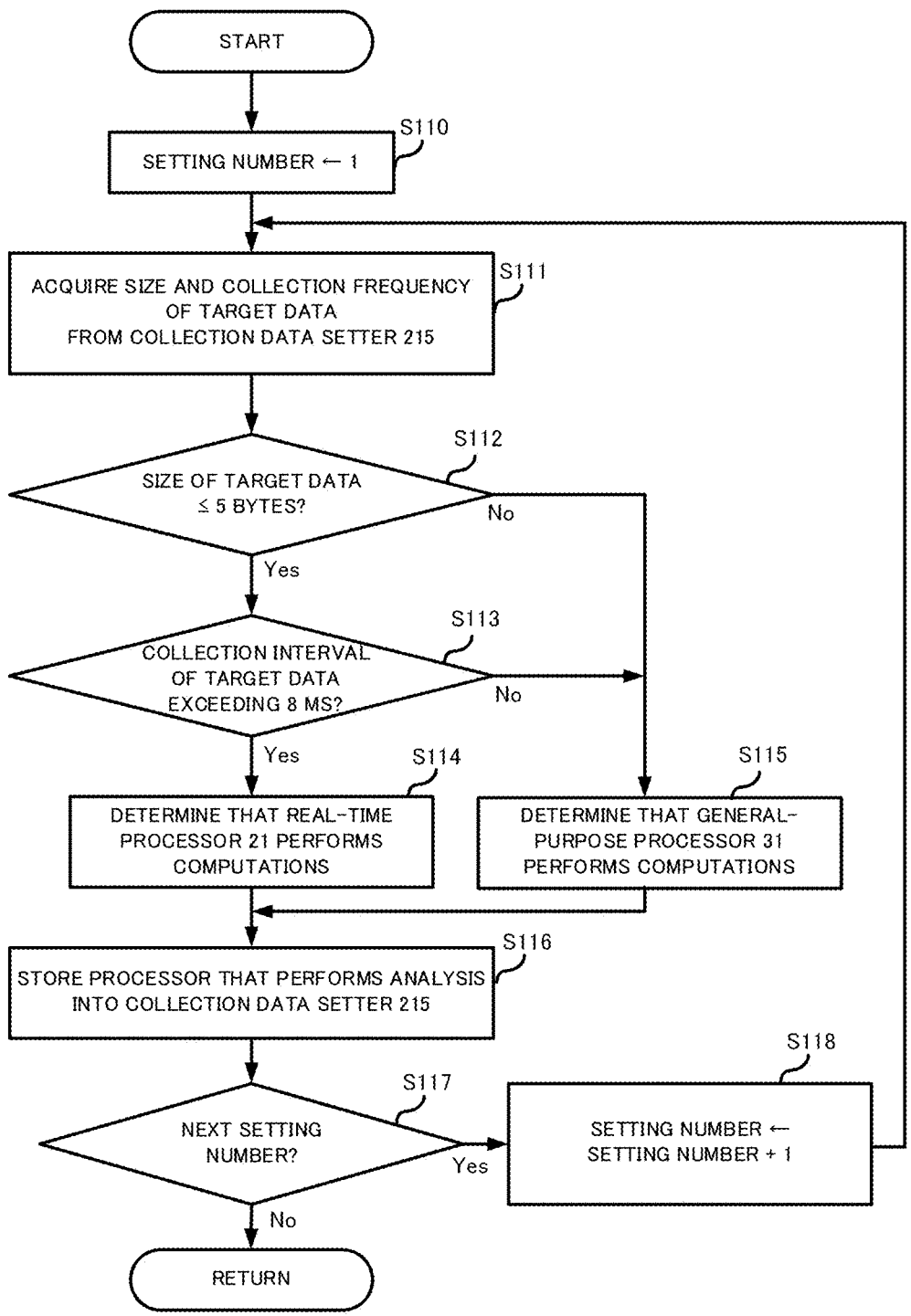
FIG. 4 is a flowchart of a determination process of an analysis target using the PLC system illustrated in FIG. 1.

FIG. 4 illustrates an example process performed by the data-type determiner 212 after the activation of the PLC system 10.

The data-type determiner 212 first acquires 1 being the first setting number set with the collection data setter 215 illustrated in FIG. 3 (S110).

The data-type determiner 212 then acquires, from the collection data setter 215, the size 5 and the collection frequency 10 of the target data with the setting number 1 (S111).

The data-type determiner 212 then determines, based on the size of the target data to be collected per unit time, one of the real-time processor 21 and the general-purpose processor 31 to perform computations on the target data. More specifically, when the target data to be collected has a data size less than or equal to a size threshold, for example, 5 bytes (Yes in S112), and the collection frequency exceeds a frequency threshold, for example, 8 milliseconds (Yes in S113), the data-type determiner 212 determines that the real-time processor 21 performs computations on the target data (S114).

The data collection setting number 1 has the data size of 5 bytes and the collection frequency of 10 milliseconds. The data-type determiner 212 thus determines that the real-time processor 21 performs computations on the target data (S114).

The data-type determiner 212 then stores, into the collection data setter 215, the processor that analyzes the data with the data collection setting number 1 (S116). In the example illustrated in FIG. 3, the data-type determiner 212 stores, into the collection data setter 215, information indicating that the real-time processor 21 performs computations on the data with the data collection setting number 1 (S116).

When the table has a next setting number (Yes in S117), the data-type determiner 212 increments the setting number by 1 (S118) and performs the processing from S111. When the table has no next setting number (No in S117), the data-type determiner 212 returns the processing.

When, for example, the current setting number is 8 and the next setting number is 9, the data-type determiner 212 returns the processing to S111 and continues the processing from S111 on the data with the setting number 9.

The data-type determiner 212 acquires, from the collection data setter 215, the data size 2 and the collection frequency 2 with the setting number 9 (S111).

The data-type determiner 212 again determines one of the real-time processor 21 and the general-purpose processor 31 to perform computations on the target data (S112 to S115).

In the example illustrated in FIG. 3, the target data with the data collection setting number 9 has a size of 2 being less than 5 bytes (Yes in S112), but has a collection frequency of 2 milliseconds not exceeding 8 milliseconds (No in S113). The data-type determiner 212 thus determines that the target data is to be analyzed by the general-purpose processor 31 (S115).

The data-type determiner 212 stores, into the collection data setter 215, information indicating that the general-purpose processor 31 performs computations on the target data with the data collection setting number 9 (S116).

The current setting number is 9 and the table has no next setting number (No in S117). The data-type determiner 212 thus returns the processing.

FIG. 5 is a table of example results acquired from the data-type determiner 212 determining the OS that performs data analysis through the above process.

Data to be collected with the data collection setting number 2 has a data size of 150 bytes not being less than or equal to 5 bytes. The data-type determiner 212 thus determines that the general-purpose processor 31 performs computations on the data. Data generated based on the determination of the data-type determiner 212 and stored into the collection data setter 215 is an example of processor identification data in the claims.

The size threshold and the frequency threshold for the target data described above are examples. These thresholds may be set to different values calculated from predicted data.

The target data may be analyzed by the data collection-analysis module 13 with a random combination of a size threshold and a frequency threshold for the target data. The time for acquiring results may be measured repeatedly to determine a combination of the thresholds that provides the analysis results with the shortest time.

Combinations of such data size thresholds and collection frequency thresholds may be automatically produced, analyzed, and measured with a program executed on the CPU module 12 or the data collection-analysis module 13.

Details of Analysis

A method for analyzing target data collected by the real-time processor 21 or the general-purpose processor 31 is now described below with reference to FIGS. 2 and 6.

The data analyzer 213 acquires data with a setting number from the temporary storage 214 and analyzes the acquired data. The data analyzer 213 determines, for example, the mean, dispersion, change rate, and features of the acquired data to analyze the data.

The data analyzer 213 stores, based on the analysis results, device data into the inter-module data exchange area 216.

The inter-module data exchange area 216 is an example of a shared area.

The data analyzer 311 acquires, through the inter-OS communicator 41, the collected data allocated to the data analyzer 311 from the temporary storage 214 and stores the data into the temporary storage 312.

Figure 6:
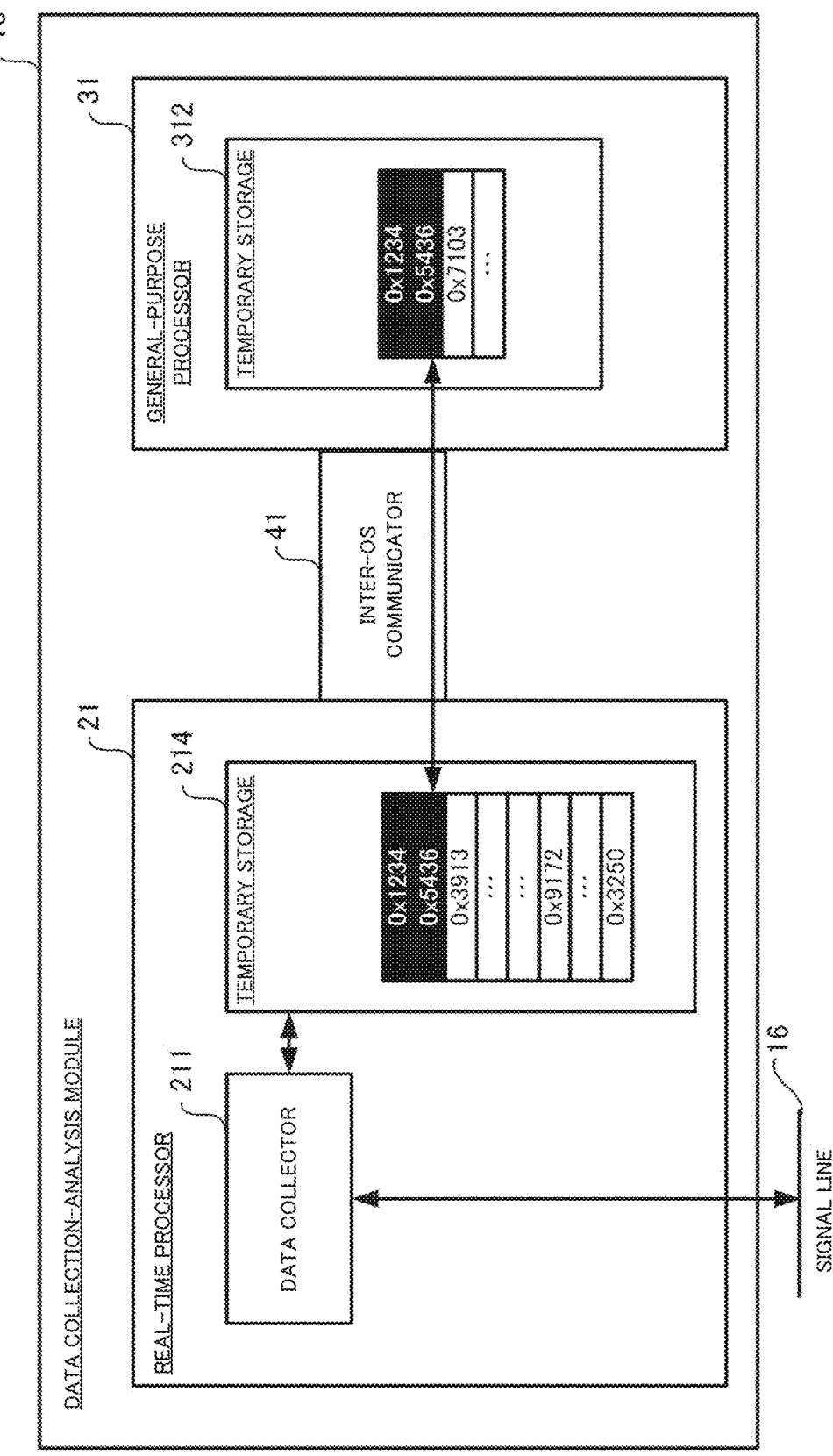
FIG. 6 is a diagram of data transmission and reception in the PLC system illustrated in FIG. 1.

FIG. 6 is a diagram of a specific example of transmission and reception of the target data collected by the data collector 211 between the temporary storage 214 and the temporary storage 312. In the example below, the data-type determiner 212 determines that the real-time processor 21 performs computations on the target data pieces indicated by 0x3913, 0x9172, and 0x3250 and the general-purpose processor 31 performs computations on the other data pieces.

The data collector 211 stores all the collected target data pieces into the temporary storage 214 independently of the real-time processor 21 or the general-purpose processor 31 performing computations on the respective target data pieces. The temporary storage 214 thus stores all the target data pieces independently of the real-time processor 21 or the general-purpose processor 31 performing computations on the respective target data pieces. In contrast, the temporary storage 312 stores, for example, target data pieces 0x1234 and 0x5436 alone that have been determined to be used for computations performed by the general-purpose processor 31.

The data analyzer 311 then performs computations to analyze the target data pieces stored in the temporary storage 312. The data analyzer 311 performs computations to acquire, for example, the mean, dispersion, change rate, correlation between the collected data pieces, and features to analyze the acquired target data pieces.

The data analyzer 311 stores, into the inter-module data exchange area 216, control data for controlling the external device generated from the analysis.

The data analyzer 311 accesses the temporary storage 214 through the inter-OS communicator 41 as a bus not through the signal lines 16. The target data can thus be transmitted or received without headers and footers. The PLC system 10 can thus improve the efficiency of data analysis when small sized data is analyzed at a high frequency.

Details of Feedback

The data collection-analysis module 13 provides control data stored in the inter-module data exchange area 216 as feedback to, for example, the CPU module 12 or the PLC module 14 from which the data has been collected. More specifically, the data collection-analysis module 13 stores control data for each module into the inter-module data exchange area 216 and causes, for example, the CPU module 12 or the PLC module 14 to acquire the corresponding control data in relatively short cycles of, for example, 50 microseconds.

The process of providing data as feedback from the data collection-analysis module 13 to the CPU module 12 is now described with reference to the flowchart illustrated in FIG. 7 and the table of example data pieces illustrated in FIG. 8.

In the example illustrated in FIG. 8, the inter-module data exchange area 216 stores instruction data pieces with instruction numbers 1 to 6.

The inter-module data exchange area 216 stores, for each instruction number as a unique identification number, the instruction target PLC module, the name of the device, the identification number of the device, and the instruction data value.

Figure 7:
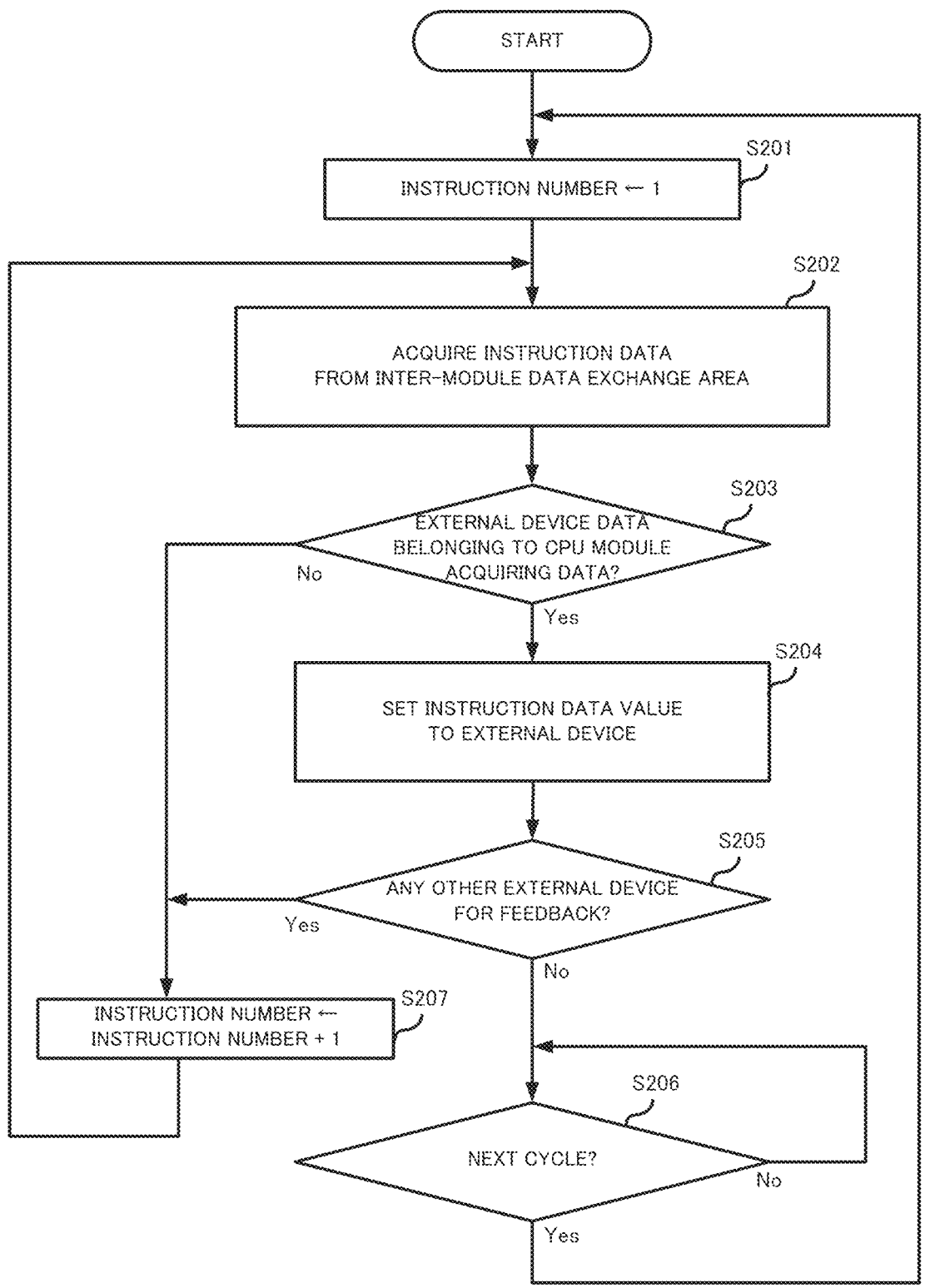
FIG. 7 is a flowchart of a feedback process using the PLC system illustrated in FIG. 1.

With reference to FIGS. 7 and 8, the CPU module 12 has an instruction number 1 (step S201).

The CPU module 12 acquires, from the inter-module data exchange area 216 through the signal lines 16, an instruction data piece with the instruction number 1 among the instruction data pieces illustrated in FIG. 8 (S202).

The CPU module 12 determines whether the acquired instruction data piece is directed to the CPU module 12 (S203).

The PLC module indicated by the instruction number 1 is a CPU module no. 1. The CPU module 12 thus determines that the instruction data piece is device data belonging to the CPU module 12 (Yes in S203). When determining that the device data does not belong to the CPU module 12 (No in S203), the CPU module 12 increments the instruction number by 1 (S207) and returns to S202.

This is determined by comparing the identification numbers allocated to the CPU modules 12 no. 1 and no. 2 with the identification number of the CPU module 12.

The CPU module 12 sets a value 8 to an external device with an identification number 4096 among external devices each having the device name of a data register (S204). This completes the feedback for the instruction data with the instruction number 1.

Upon detecting any other external device to which the CPU module 12 provides data as feedback (Yes in S205), the CPU module 12 increments the instruction number by 1 (S207) and returns to S202.

Upon detecting no external device to which the CPU module 12 provides data as feedback (No in S205), the CPU module 12 waits for a next cycle (No in S206). At the start of the next cycle, the CPU module 12 returns to S201 (Yes in S206).

The PLC module 14 also performs the process illustrated in FIG. 7 to provide data as feedback to devices belonging to the PLC module 14.

Through this process, the results from analysis performed by the data analyzer 213 and by the data analyzer 311 are provided as feedback to the respective PLC modules.

Referring back to FIG. 2, the method for sharing the device data about the external devices between the data collection-analysis module 13 and other modules is now described in detail.

The device data written to the inter-module data exchange area 216 is shared between the data collection-analysis module 13 and the other modules at relatively short intervals, for example, in constant cycles of the order of microseconds.

For example, the PLC module 14 illustrated in FIG. 1 accesses the inter-module data exchange area 216 illustrated in FIG. 2 to acquire the device data stored by the data collection-analysis module 13. The data collection-analysis module 13 accesses the inter-module data exchange area 216 to acquire the device data stored by the PLC module 14.

For example, the data collector 211 allocates, in the temporary storage 214, a temporary area with a size corresponding to the data set by the collection data setter 215 upon activation of the data collection-analysis module 13. After the temporary area is allocated in the temporary storage 214, the data collector 211 collects, through the signal lines 16, data from the other modules, such as the CPU module 12 and the PLC module 14, mounted on the base unit 18 illustrated in FIG. 1 and stores the collected data into the temporary area allocated in the temporary storage 214 rather than storing the collected data as a file.

Advantageous Effects of PLC System 10

The real-time processor 21 described above is operated by the real-time OS and collects data through the signal lines 16.

The PLC system 10 analyzes any data with high transferring cost, or specifically, any data including additional data added for data transfer through the signal lines 16 and having a larger size ratio of the additional data to the original data, without transferring such data. The PLC system 10 can thus perform efficient analysis.

In the PLC system 10, the real-time processor 21 and the general-purpose processor 31 perform analysis together. The real-time processor 21 is thus less susceptible to complex analysis and is less likely to decrease the temporal accuracy of control.

Additionally, the real-time processor 21 and the general-purpose processor 31 can communicate with each other not through the network. The PLC system 10 can thus avoid a decrease in the accuracy of control due to network delays. The PLC system 10 also lowers the likelihood that communications about the target devices are tapped or tampered on the network.

In the present embodiment, the real-time processor 21 and the general-purpose processor 31 are connected to each other not through the network. In some embodiments, the real-time processor 21 and the general-purpose processor 31 may be connected to each other through a network.

Hardware Structure of Data Collection-Analysis Module 13

Figure 9:
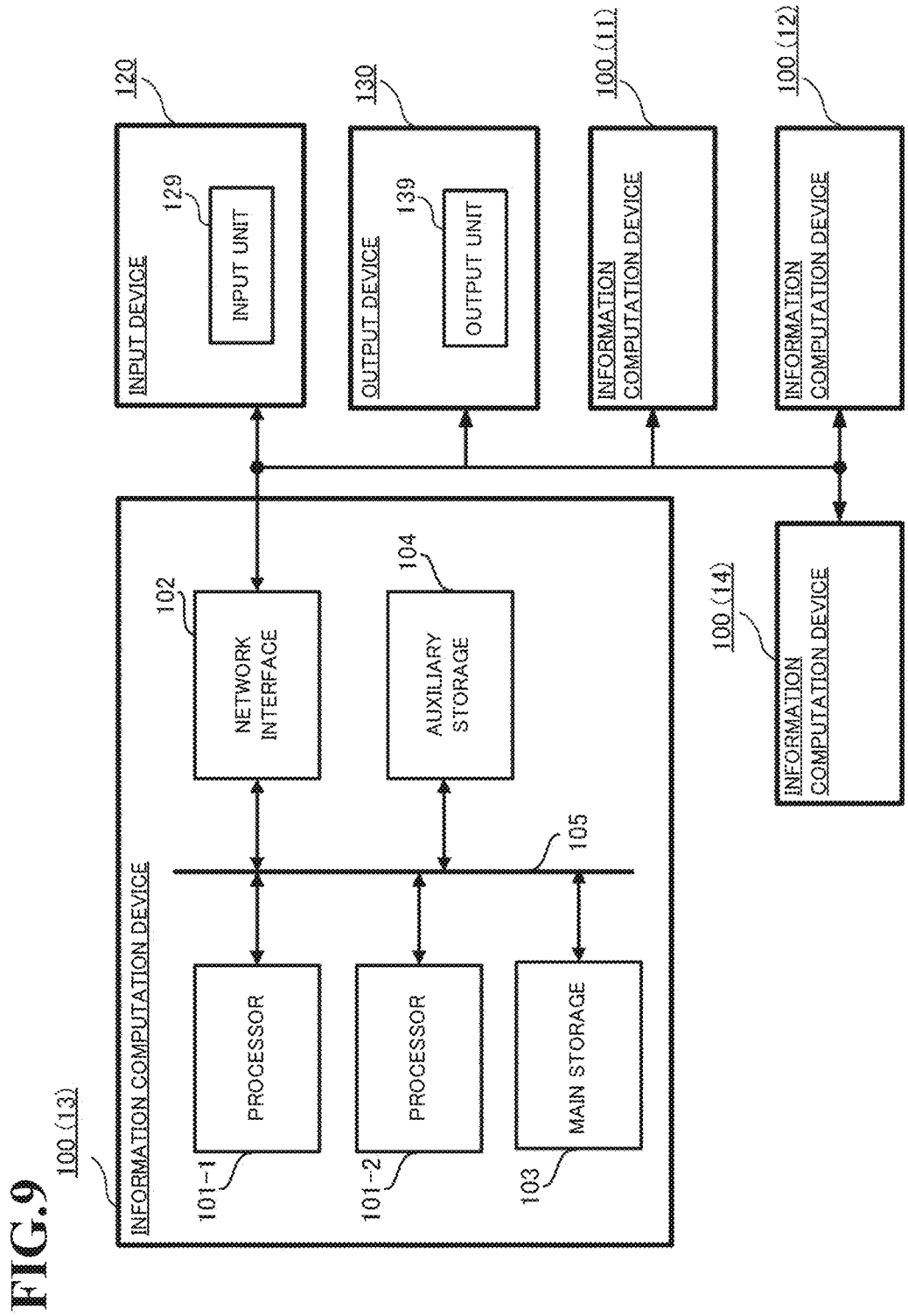
FIG. 9 is a diagram of the PLC system illustrated in FIG. 1, illustrating a specific example hardware structure.

FIG. 9 is a block diagram of an information computation device 100, illustrating an example hardware structure implementing the data collection-analysis module 13.

The information computation device 100 includes processors 101-1 and 101-2 that perform various computations described later, a network interface (IF) 102 that communicates with other devices including an input device 120 and an output device 130, a main storage 103 that temporarily stores information such as a dynamic random-access memory (DRAM) or a static random-access memory (SRAM), an auxiliary storage 104 that permanently stores information such as a hard disk drive (HDD) or a solid state drive (SSD), and a bus 105 as a path for information exchanged between the processors 101, the network interface 102, the main storage 103, and the auxiliary storage 104.

The processor 101-1 is an example of hardware implementing the first CPU illustrated in FIG. 1. The processor 101-2 is an example of hardware implementing the second CPU 30 illustrated in FIG. 1. The network interface 102 is an example of hardware implementing the signal lines 16 illustrated in FIG. 1. The bus 105 is an example of hardware implementing the inter-OS communicator 41 illustrated in FIG. 1.

The input device 120 receives inputs of external data. The input device 120 includes, for example, a human interface device such as a mouse, a keyboard, a touchscreen, and a microphone. The input device 120 includes an input unit 129 that detects, for example, the state of buttons or keys to input information.

The input device 120 may be a reception interface that detects signals transmitted from other devices, such as a parallel or serial bus.

The output device 130 is an information output device that displays various items of information to a user, and includes, for example, a liquid crystal display, a cathode-ray tube (CRT) display, or an organic electroluminescent (EL) display. The output device 130 includes, for example, a plotter or a printer that prints information in the form of, for example, text or an image. The output device 130 includes an output unit 139 that outputs information from, for example, the display or the printer.

The information computation device 100 can also implement, for example, the power module 11, the CPU module 12, and the PLC module 14.

Embodiment 2

Although the data collection-analysis module 13 in the PLC system 10 includes the two CPUs, or more specifically, the first CPU 20 and the second CPU 30, the data collection-analysis module 13 may include a single CPU.

Figure 10:
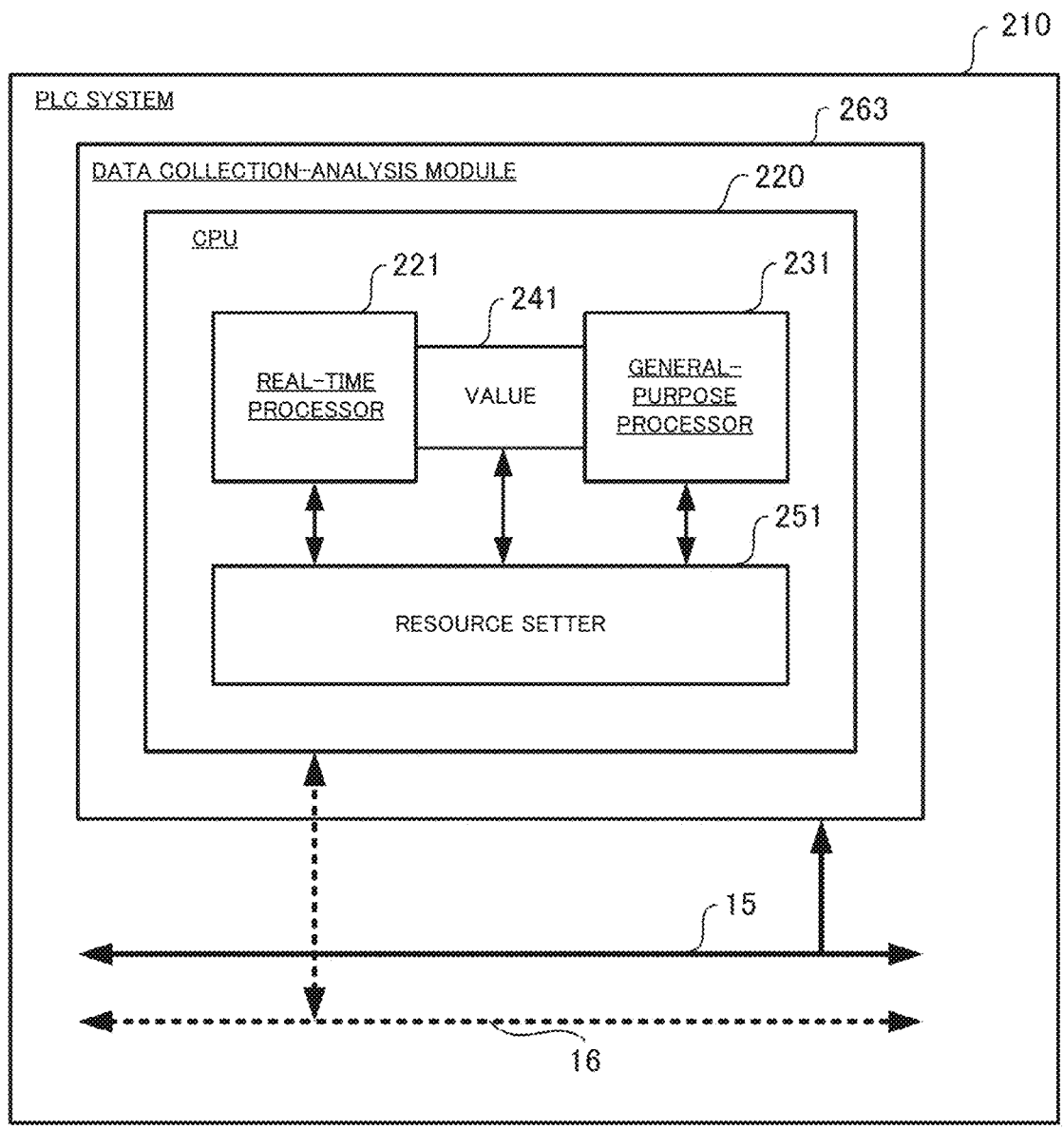
FIG. 10 is a block diagram of a module included in a PLC system according to Embodiment 2 of the present disclosure.

A PLC system 210 according to Embodiment 2 of the present disclosure illustrated in FIG. 10 includes a data collection-analysis module 263 including a single CPU 220.

The components that differ from the components in the PLC system 10 are mainly described below.

The data collection-analysis module 263 includes a real-time processor 221, a general-purpose processor 231, an inter-OS communicator 241, and a resource setter 251 that sets the ratio with which the resource of the CPU 220 is allocated to the real-time processor 221 and the general-purpose processor 231.

The CPU 220 executes a hypervisor. The CPU 220 operates a real-time OS and a general-purpose OS. The CPU 220 operates the real-time OS and the general-purpose OS on the hypervisor to implement the functions of the real-time processor 221 and the general-purpose processor 231.

For example, the data collection-analysis module 263 divides, with the ratio set by the resource setter 251, a time available in the CPU into a time for operation of the real-time processor 221 and a time for operation of the general-purpose processor 231.

The hypervisor also implements the function of the inter-OS communicator 241 through communication, such as inter-process communication, between the real-time OS and the general-purpose OS.

Hardware Structure of Data Collection-Analysis Module 263

Figure 11:
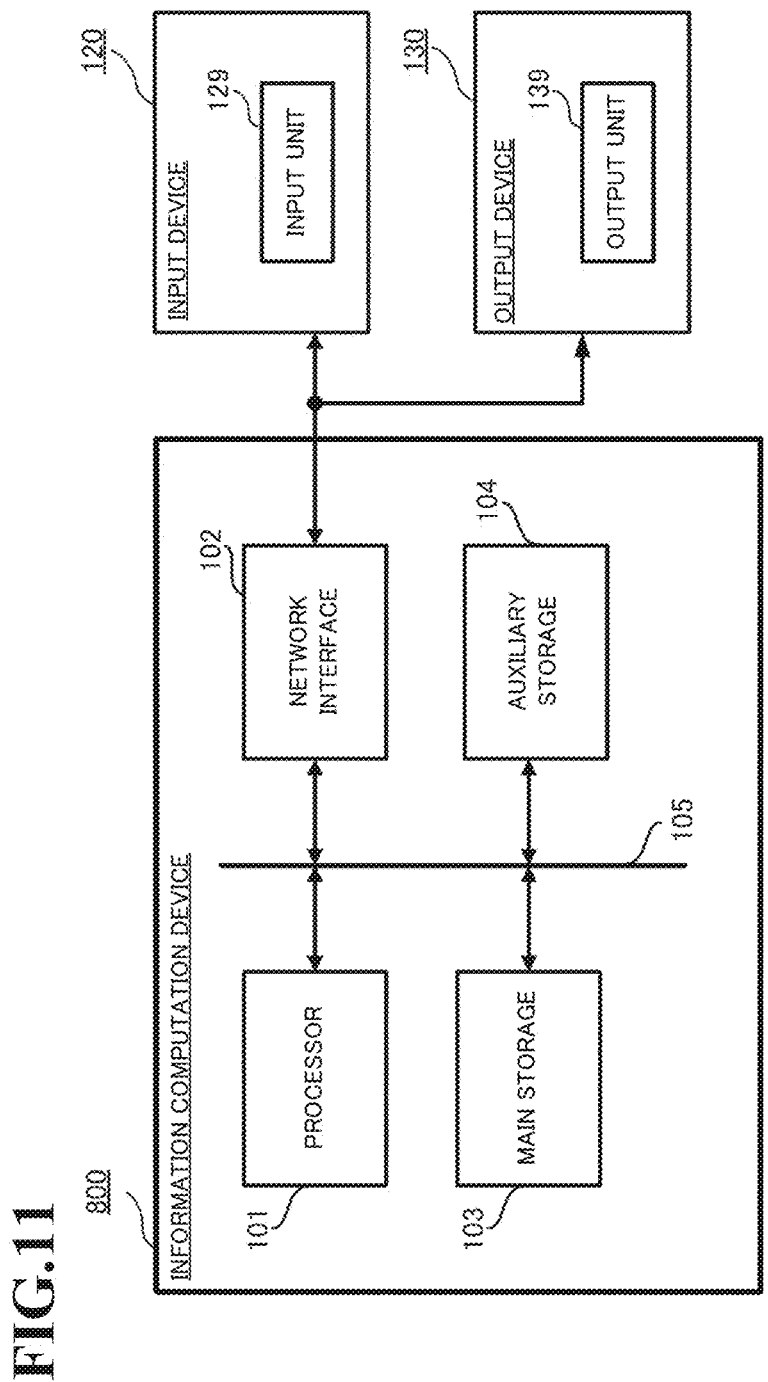
FIG. 11 is a diagram of the module illustrated in FIG. 10, illustrating a specific example hardware structure.

FIG. 11 is a block diagram of an information computation device 800, illustrating an example hardware structure implementing the data collection-analysis module 263.

The information computation device 800 includes a single processor 101, unlike the information computation device 100 including the two processors 101-1 and 101-2.

The processor 101 is an example of hardware implementing the real-time processor 221, the general-purpose processor 231, the inter-OS communicator 241, and the resource setter 251 illustrated in FIG. 10.

The PLC system 210 can perform efficient analysis using the data collection-analysis module 263 including the single CPU.

Modifications

In the PLC system 10, an operator of the PLC system 10 sets, with the data-type determiner 212, a size threshold and a frequency threshold for target data as references for determining one of the real-time processor 21 and the general-purpose processor 31 to analyze the target data. The size threshold and the frequency threshold for the target data may be set with the data-type determiner 212 differently. The size threshold and the frequency threshold for the target data to be collected may be set through machine learning.

A PLC system 310 according to a modification of the present disclosure is described below.

Figure 12:
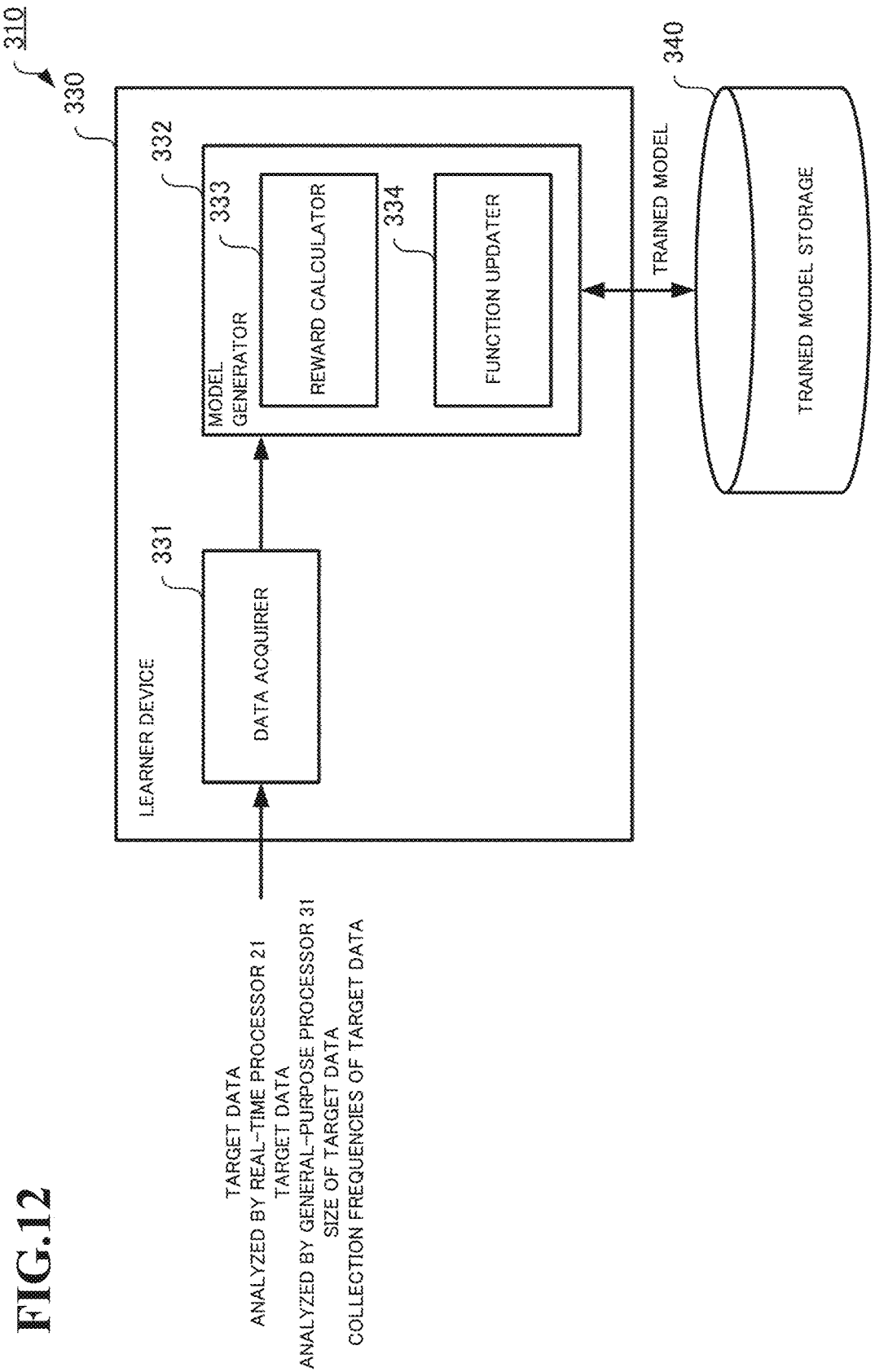
FIG. 12 is a block diagram of a PLC system according to a modification.

As illustrated in FIG. 12, the PLC system 310 includes a learner device 330 and a trained model storage 340.

A learning phase and a usage phase are described below separately.

Learning Phase

The PLC system 310 performs machine learning about size thresholds. The learner device 330 included in the PLC system 310 includes a data acquirer 331 and a model generator 332.

The data acquirer 331 acquires, as input data, learning data including target data pieces to be analyzed by the real-time processor 21, target data pieces to be analyzed by the general-purpose processor 31, the sizes of the target data pieces, and the collection frequencies of the target data pieces. Among the data pieces collected, the target data pieces analyzed by the real-time processor 21 and the target data pieces analyzed by the general-purpose processor 31 are randomly changed during learning. For example, the information illustrated in FIG. 3 can be used as the learning data with the sizes of the target data pieces and the collection frequencies of the target data pieces.

The model generator 332 learns a size threshold based on the learning data. More specifically, the model generator 332 generates a trained model that infers the size threshold based on the target data pieces to be analyzed by the real-time processor 21, the target data pieces to be analyzed by the general-purpose processor 31, the sizes of the target data pieces, and the collection frequencies of the target data pieces.

The model generator 332 may use a known learning algorithm such as supervised learning, unsupervised learning, or reinforcement learning. In the example described below, reinforcement learning is used. In reinforcement learning, an agent (action performer) in an environment observes a current state (parameters in the environment) and determines an action to perform. The action of the agent dynamically changes the environment, and the agent receives a reward based on the changes in the environment. The agent repeats the process and learns an action policy that maximizes rewards to be acquired over the series of actions. Q-learning and temporal difference (TD) learning are known as typical reinforcement learning methods. In Q-learning, for example, a general update formula for an action value function Q(s, a) is indicated with Formula 1.

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In Formula 1, st is the state of environment at time t, and at is the action at time t. The action at changes the state to st+1. A reward acquired from any change of the state is rt+1, $\gamma$ is a discount factor with a range of $0<\gamma\leq1$, and $\alpha$ is a learning coefficient with a range of $0<\alpha\leq1$. The state st includes the target data pieces analyzed by the real-time processor 21, the target data pieces analyzed by the general-purpose processor 31, the sizes of the target data pieces, and the collection frequencies of the target data pieces. The best action at the time t and the state st is learned.

The update formula indicated with Formula 1 yields a greater action value Q when an action value Q of an action a having the greatest Q-value at time t+1 is greater than an action value Q of the action a performed at time t and yields a less action value Q when the action value Q at time t+1 is less than the action value Q performed at time t. In other words, the action value function Q(s, a) is updated to approximate the action value Q of the action a at time t to the optimal action value at time t+1. Thus, an optimal action value in an environment affects an action value in an earlier stage of the environment in a sequential manner.

To generate a trained model by reinforcement learning as described above, the model generator 332 includes a reward calculator 333 and a function updater 334.

The reward calculator 333 calculates a reward based on the target data pieces analyzed by the real-time processor 21, the target data pieces analyzed by the general-purpose processor 31, the sizes of the target data pieces, and the collection frequencies of the target data pieces. The reward calculator 333 calculates, for example, a reward r based on an analysis time used for computations on the target data pieces collected during a predetermined time to complete the analysis. For example, when a current action has a shorter analysis time than the analysis time in a previous action, the reward r is increased (for example, by a reward of 1). In contrast, when the current action has a longer analysis time than the analysis time in the previous action, the reward r is decreased (for example, by a reward of −1).

The function updater 334 updates, based on the reward calculated by the reward calculator 333, a function for determining a size threshold and outputs the function to the trained model storage 340. In Q-learning, for example, the action value function Q(st, at) indicated with Formula 1 is used as a function to calculate a size threshold.

The learning process described above is performed repeatedly. The trained model storage 340 stores the action value function Q(st, at) updated by the function updater 334, or more specifically, stores a trained model.

Figure 13:
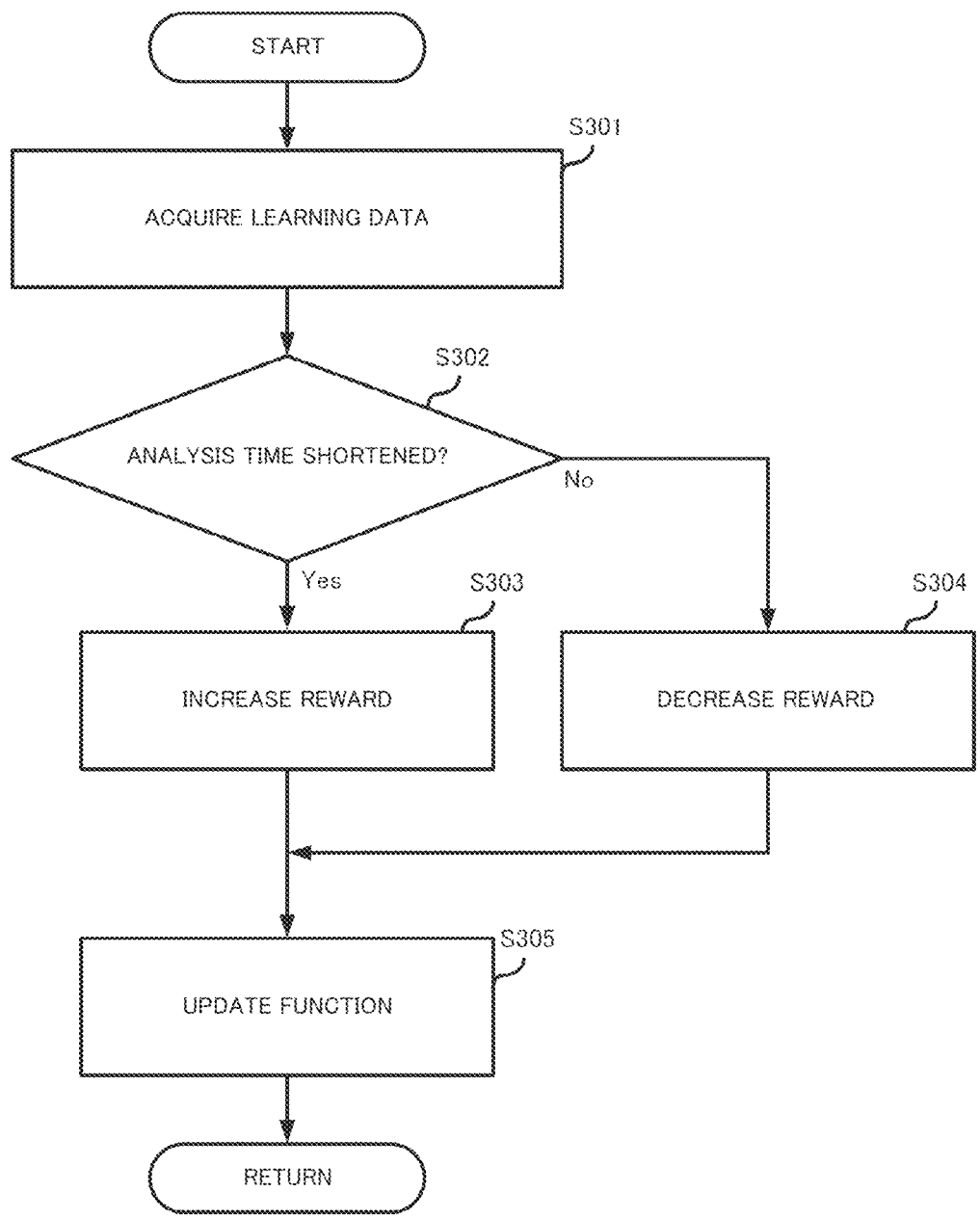
FIG. 13 is a flowchart of a learning process using the PLC system illustrated in FIG. 12.

A learning process performed by the learner device 330 is now described with reference to FIG. 13.

The data acquirer 331 acquires, as learning data, data pieces to be analyzed by the real-time processor 21 among the data to be collected, the sizes of the data pieces, and the collection frequencies of the data pieces (S301).

The model generator 332 calculates the reward based on the target data pieces analyzed by the real-time processor 21, the target data pieces analyzed by the general-purpose processor 31, the sizes of the target data pieces, and the collection frequencies of the target data pieces. More specifically, the reward calculator 333 acquires the target data pieces analyzed by the real-time processor 21, the target data pieces analyzed by the general-purpose processor 31, the sizes of the target data pieces, and the collection frequencies of the target data pieces, and determines whether to increase or to decrease the reward based on a comparison with the previous analysis time (S302).

When determining to increase the reward (Yes in S302), the reward calculator 333 increases the reward (S303). When determining to decrease the reward (No in S302), the reward calculator 333 decreases the reward (S304).

The function updater 334 updates, based on the reward calculated by the reward calculator 333, the action value function Q(st, at) indicated with Formula 1 stored in the trained model storage 340 (S305).

The learner device 330 repeats the process in steps S301 to S305 described above and stores the generated action value function Q(st, at) as a trained model.

Although the learner device 330 stores the trained model into the trained model storage 340 external to the learner device 330, the trained model storage 340 may be incorporated in the learner device 330.

Usage Phase

Figure 14:
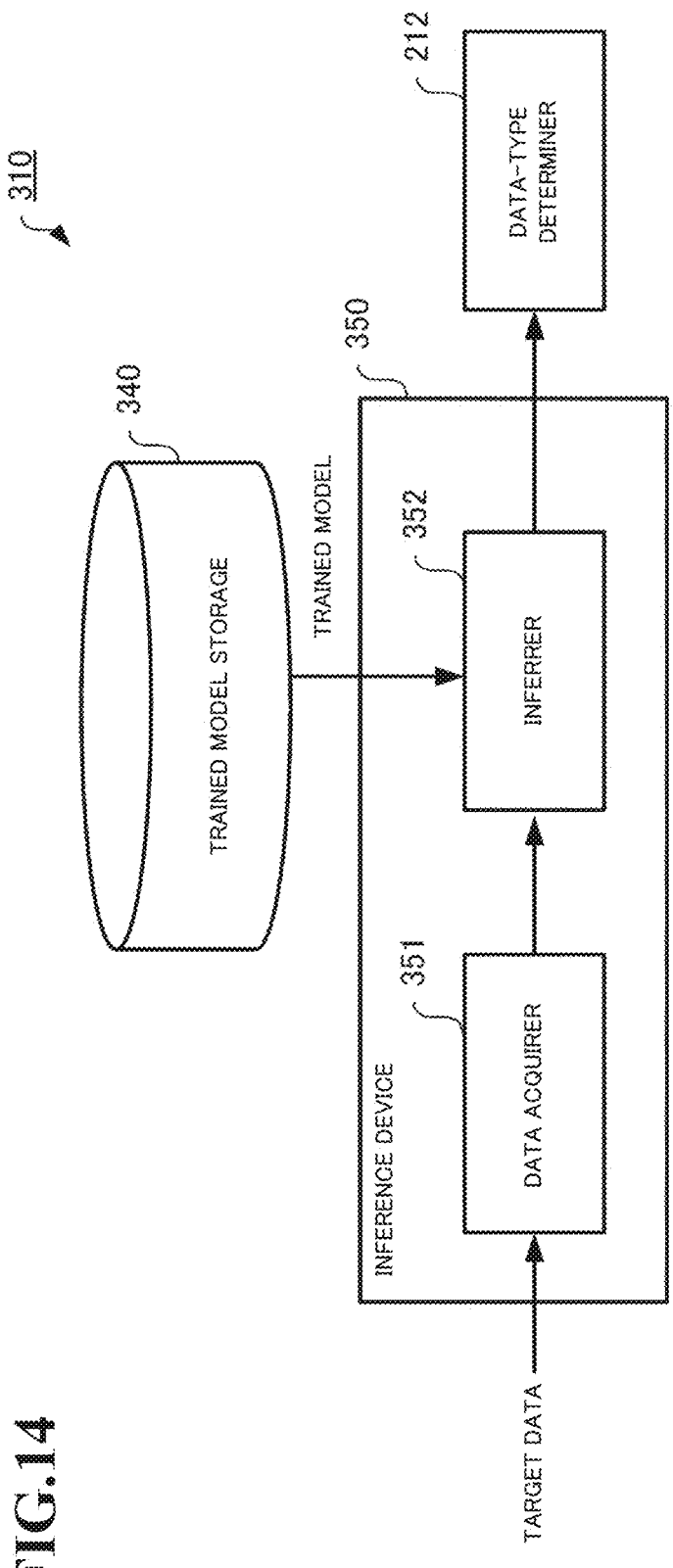
FIG. 14 is a block diagram of an inference device in the PLC system illustrated in FIG. 12.

FIG. 14 is a block diagram of an inference device 350 corresponding to the data-type determiner 212. The PLC system 310 includes the inference device 350 in addition to the trained model storage 340. The inference device 350 includes a data acquirer 351 and an inferrer 352.

The data acquirer 351 acquires target data.

The inferrer 352 uses the trained model to infer a C output. More specifically, the inferrer 352 inputs the target data acquired by the data acquirer 351 into this trained model, and can infer a size threshold for the target data as a reference for determining one of the real-time processor 21 and the general-purpose processor 31 to analyze the target data.

In the present modification, the size threshold is output using the trained model learned by the model generator 332 in the data collection-analysis module 13. In some embodiments, the size threshold for the target data may be output based on a trained model acquired from another data collection-analysis module 13.

Figure 15:
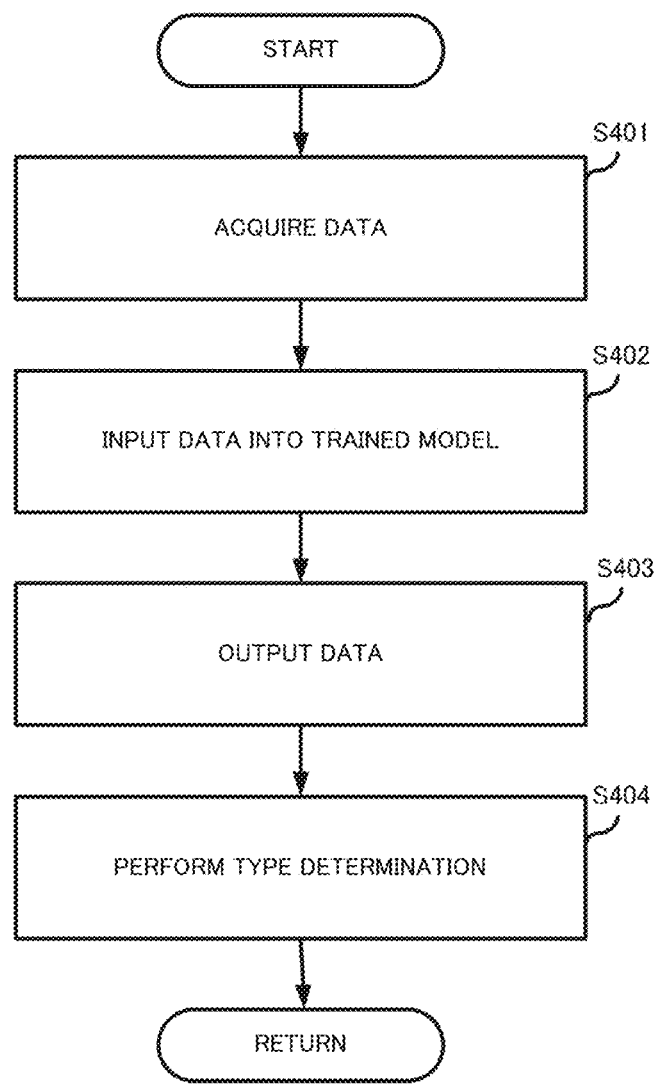
FIG. 15 is a flowchart of a determination process using the PLC system illustrated in FIG. 12.

A process for acquiring a size threshold for target data with the learner device 330 is now described with reference to FIG. 15.

The data acquirer 351 acquires target data (S401).

The inferrer 352 inputs the target data into a trained model stored in the trained model storage 340 and acquires a size threshold for the target data (S402). The inferrer 352 outputs the acquired size threshold for the target data to the data-type determiner 212 (S403).

The data-type determiner 212 uses the size threshold for the target data to determine one of the real-time processor 21 and the general-purpose processor 31 to perform computations on the target data (S404). In this manner, the analysis time can be shortened.

In the present modification, the learner device 330 learns the size threshold for the target data, and the inference device 350 infers the size threshold for the target data, but the structure is not limited to this example. For example, the learner device 330 may learn the collection frequency threshold for the target data, and the inference device 350 may infer the collection frequency threshold for the target data.

Although the learning algorithm used by the inferrer 352 is reinforcement learning in the present modification, the inferrer 352 may use other algorithms. Learning algorithms other than reinforcement learning may include supervised learning, unsupervised learning, and semi-supervised learning.

The model generator 332 may use deep learning for learning extraction of features as a learning algorithm or may perform machine learning using other known methods such as a neural network, genetic programming, functional logic programming, and a support-vector machine.

The learner device 330 and the inference device 350 may be connected to the data collection-analysis module 13 through, for example, a network and may be separate from the data collection-analysis module 13. The learner device 330 and the inference device 350 may be incorporated in the data collection-analysis module 13. The learner device 330 and the inference device 350 may be located in a cloud server.

The model generator 332 may perform learning using learning data acquired from multiple data collection-analysis modules 13. The model generator 332 may acquire learning data from multiple data collection-analysis modules 13 used in the same area or may use learning data collected from multiple data collection-analysis modules 13 operating independently of one another in different areas to learn a C output. A data collection-analysis module 13 to collect the learning data may be added or removed during the process. The learner device 330 that has learned thresholds for target data for a data collection-analysis module 13 may be used for a different data collection-analysis module 13 to relearn thresholds for the target data for the different data collection-analysis module 13 for update.

The methods described in the above embodiments can be written to a non-transitory recording medium, such as a magnetic disk, an optical disk, a magneto-optical disk, and a semiconductor memory, to be used as computer-executable programs in various devices. A computer that implements one or more embodiments of the present disclosure reads a program stored in the non-transitory recording medium and operates under control of the program to perform the above processes.

The present disclosure is not limited to the examples of the aspects described above and may be modified as appropriate to be used in other aspects.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 10, 310 PLC system
11 Power module
12 CPU module
13 Data collection-analysis module
14 PLC module
15 Power line
16 Signal line
18 Base unit
19 External device
20 First CPU
21, 221 Real-time processor
30 Second CPU
31, 231 General-purpose processor
41 Inter-OS communicator
212 Data-type determiner
211 Data collector
213 Data analyzer
214 Temporary storage
215 Collection data setter
216 Inter-module data exchange area
311 Data analyzer
312 Temporary storage
220 CPU
241 Inter-OS communicator
251 Resource setter
263 Data collection-analysis module
800 Information computation device
101 Processor
102 Network interface
103 Main storage
104 Auxiliary storage
105 Bus
120 Input device
129 Input unit
130 Output device
139 Output unit
330 learner device
331 Data acquirer
332 Model generator
333 Reward calculator
334 Function updater
340 Trained model storage
350 Inference device
351 Data acquirer
352 Inferrer

The invention claimed is:

1. A control system, comprising:
a first module connected to an external device via a network and configured to control the external device based on control data; and
a data collection-analysis module including:
a first processor connected through the network to the first module,
the first processor being configured to
determine whether target data collected from the first module is less than or equal to a size threshold,
execute a real-time operating system to perform a computation on the target data when the target data is less than or equal to the size threshold to generate the control data; and
a second processor connected to the first processor via a connection other than the network and configured to acquire, from the first processor, the target data from the first processor when the target data is determined to be greater than the size threshold, and perform a computation on the target acquired from the first processor to generate the control data.

2. The control system according to claim 1, wherein the first processor performs the computation on the target data when the target data is less than or equal to the size threshold and is collected at a collection frequency exceeding a threshold for the collection frequency.

3. The control system according to claim 1, wherein the first processor and the second processor are connected to each other via a PCI-Express interface.

4. The control system according to claim 1, further comprising:
a data collector to collect the target data from the first module; and
a temporary storage being a volatile storage, controllable by the first processor, and accessible by the second processor, wherein
the data collector stores the target data collected from the first module into the temporary storage.

5. The control system according to claim 1, further comprising:
a shared area to store the control data generated by the first processor or the second processor, wherein
the control data stored in the shared area is acquired repeatedly by the first module through the network.

6. A control method for operating a control system including a first module and data collection-analysis module connected through a network to the first module connected to an external device, the first module controlling the external device based control data, the data collection-analysis module including a first processor and a second processor, the method comprising:
  causing the first processor to determine whether target data collected from the first module is less than or equal to a size threshold;
  causing the first processor to execute a real-time operating system to perform a computation on the target data when the target data is less than or equal to the size threshold to generate the control data;
  causing the second processor connected to the first processor via a connection other than the network to acquire, from the first processor, the target data on which the first processor when the target data is determined to be greater than the size threshold and perform a computation on the target data acquired from the first processor to generate the control data; and
  cause the first module to control the external device based on the control data.

7. A programmable logic controller, comprising:
  a first module connected to an external device via a network and configured to control the external device based on control data; and
  a second module connected to the first module through the network, the second module including
  the first processor being configured to
    determine whether target data collected from the first module is less than or equal to a size threshold,
    execute a real-time operating system to perform a computation on the target data when the target data is less than or equal to the size threshold to generate the control data; and
  a second processor connected to the first processor via a connection other than the network and configured to acquire, from the first processor, the target data from the first processor when the first processor determines the target data to be greater than the size threshold and perform a computation on the target data acquired from the first processor to generate the control data, wherein
  the first module acquires the control data generated by the first processor or the second processor to control the external device.

8. The programmable logic controller according to claim 7, further comprising:
  a data acquirer to acquire learning data including a size of the target data to be collected, a collection frequency of the target data to be collected, and data to be analyzed by the first processor among the target data to be collected; and
  a model generator to generate, using as input data the learning data acquired by the data acquirer, a trained model for inferring the size threshold and a threshold for the collection frequency based on a size of the target data to be collected and a collection frequency of the target data to be collected.

* * * * *